(12) United States Patent
Li et al.

(10) Patent No.: US 11,677,657 B2
(45) Date of Patent: Jun. 13, 2023

(54) METHOD AND APPARATUS FOR OBTAINING INFORMATION ABOUT FORWARDING PATH OF DATA PACKET IN SEGMENT ROUTING

(71) Applicant: Huawei Technologies Co., Ltd., Shenzhen (CN)

(72) Inventors: Cheng Li, Beijing (CN); Stefano Previdi, Shenzhen (CN); Guoyi Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 17/145,564

(22) Filed: Jan. 11, 2021

(65) Prior Publication Data

US 2021/0135979 A1 May 6, 2021

Related U.S. Application Data

(63) Continuation of application No. PCT/CN2019/092446, filed on Jun. 23, 2019.

(30) Foreign Application Priority Data

Jul. 9, 2018 (CN) .................. 201810744644.X

(51) Int. Cl.
*H04L 45/128* (2022.01)
*H04L 45/24* (2022.01)
*H04L 45/00* (2022.01)
*H04L 45/50* (2022.01)
*H04L 45/02* (2022.01)
*H04L 69/04* (2022.01)
*H04L 45/12* (2022.01)

(52) U.S. Cl.
CPC .......... *H04L 45/1287* (2013.01); *H04L 45/02* (2013.01); *H04L 45/04* (2013.01); *H04L 45/12* (2013.01); *H04L 45/24* (2013.01); *H04L 45/34* (2013.01); *H04L 45/50* (2013.01); *H04L 69/04* (2013.01)

(58) Field of Classification Search
None
See application file for complete search history.

(56) References Cited

U.S. PATENT DOCUMENTS 9,537,769 B2 1/2017 Bryant et al.
2014/0269422 A1* 9/2014 Filsfils .................... H04L 45/50
370/254
2015/0055654 A1 2/2015 Song
(Continued)

FOREIGN PATENT DOCUMENTS

CN 105282028 A 1/2016
CN 105850082 A 8/2016
(Continued)

*Primary Examiner* — Jay L Vogel
(74) *Attorney, Agent, or Firm* — Conley Rose, P.C.

(57) ABSTRACT

A method and an apparatus for obtaining information about a forwarding path of a data packet in segment routing (SR) include, when a first path indicated by a plurality of path identifiers in initial information is a unique shortest path from a start node on the first path to an end node on the first path, the first path is indicated using a node-segment identifier (SID) of the end node on the first path instead of the path identifiers.

20 Claims, 6 Drawing Sheets

(56) References Cited

U.S. PATENT DOCUMENTS

| | | | |
|---|---|---|---|
| 2015/0117203 A1* | 4/2015 | Filsfils | H04L 12/66 |
| | | | 370/235 |
| 2016/0021000 A1 | 1/2016 | Previdi et al. | |
| 2017/0346720 A1* | 11/2017 | Lazzeri | H04L 45/20 |
| 2017/0373966 A1 | 12/2017 | Liao et al. | |
| 2018/0343190 A1* | 11/2018 | Hao | H04L 45/50 |
| 2019/0007372 A1* | 1/2019 | Bhat | H04L 45/50 |
| 2019/0280960 A1* | 9/2019 | Ceccarelli | H04L 45/124 |
| 2020/0213223 A1* | 7/2020 | Peng | H04L 47/72 |

FOREIGN PATENT DOCUMENTS

| | | |
|---|---|---|
| CN | 105871721 A | 8/2016 |
| CN | 108156077 A | 6/2018 |
| WO | 2017198319 A1 | 11/2017 |

\* cited by examiner

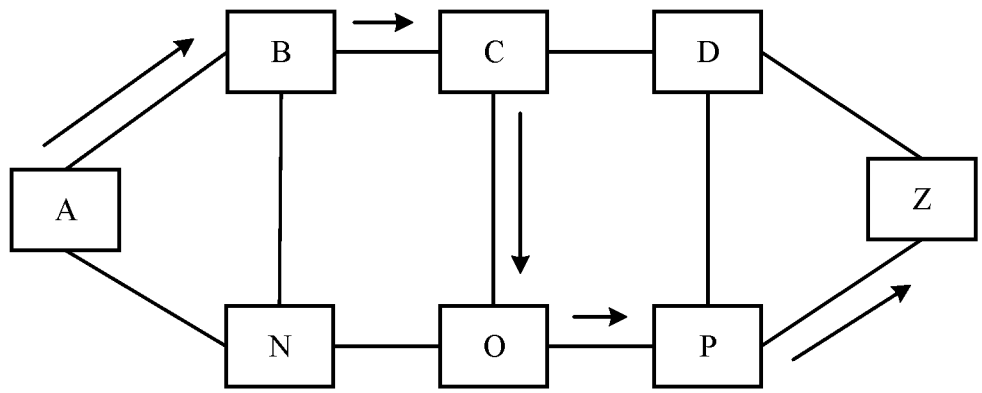

FIG. 1

| S201: Obtain initial information of a forwarding path of a data packet, where the initial information includes a plurality of path identifiers |
|---|

↓

| S202: Generate target information of the forwarding path of the data packet based on the initial information, where the target information includes one or more node segment identifiers, at least one node segment identifier in the target information corresponds to a plurality of path identifiers in the initial information, a first path indicated by a plurality of path identifiers in the initial information that correspond to a node segment identifier in the target information is a unique shortest path from a start node on the first path to an end node on the first path in the segment routing, and each node segment identifier that is in the target information and that corresponds to a plurality of path identifiers in the initial information is a node segment identifier of an end node on a path indicated by all the path identifiers corresponding to the node segment identifier |
|---|

FIG. 2

METHOD AND APPARATUS FOR OBTAINING INFORMATION ABOUT FORWARDING PATH OF DATA PACKET IN SEGMENT ROUTING

CROSS-REFERENCE TO RELATED APPLICATIONS

This application is a continuation of International Patent Application No. PCT/CN2019/092446 filed on Jun. 23, 2019, which claims priority to Chinese Patent Application No. 201810744644.X filed on Jul. 9, 2018. The disclosures of the aforementioned applications are hereby incorporated by reference in their entireties.

TECHNICAL FIELD

This application relates to the communications field, and in particular, to a method and an apparatus for obtaining information about a forwarding path of a data packet in segment routing (SR).

BACKGROUND

SR is a source routing mechanism. If an SR tunnel is very long, for example, segment routing over Internet Protocol (IP) version 6 (IPv6) data plane (SRv6), a length of an identifier (ID) list used to indicate a path through which a data packet passes is very long. An excessively long ID list reduces data packet transmission efficiency, and finally degrades performance of a communications network.

SUMMARY

This application provides a method and an apparatus for obtaining information about a forwarding path of a data packet in segment routing, to help reduce a length of an identifier list used to indicate a path through which the data packet passes, help improve data packet transmission efficiency, and finally improve performance of a communications network.

According to a first aspect, this application provides a method for obtaining information about a forwarding path of a data packet in segment routing. The method includes obtaining initial information of the forwarding path of the data packet, where the initial information includes a plurality of path identifiers, and generating target information of the forwarding path of the data packet based on the initial information, where the target path information includes one or more node segment identifiers, at least one node segment identifier in the target information corresponds to a plurality of path identifiers in the initial information, a first path indicated by a plurality of path identifiers in the initial information that correspond to a node segment identifier in the target information is a unique shortest path from a start node on the first path to an end node on the first path in the segment routing, and each node segment identifier that is in the target information and that corresponds to a plurality of path identifiers in the initial information is a node segment identifier of an end node on a path indicated by all the path identifiers corresponding to the node segment identifier.

In the method, when the first path indicated by the plurality of path identifiers in the initial information is the unique shortest path from the start node on the first path to the end node on the first path, the first path may be indicated using a node segment identifier (SID) of the end node on the first path instead of the plurality of path identifiers such that a quantity of path identifiers can be reduced, data packet transmission efficiency can be further improved, and finally, performance of a communications network is improved.

In addition, to reduce a quantity of path identifiers, a quantity of times of inserting a path identifier by an ingress node that forwards the data packet may also be reduced, to improve processing performance of the ingress node, and further improve performance of a communications network.

With reference to the first aspect, in a first possible implementation, generating target information of the forwarding path of the data packet based on the initial information includes step 1: obtain a node list of the forwarding path of the data packet, use the $i^{th}$ node in the node list as a start node, use the $j^{th}$ node in the node list as an end node, where a value of i is 1, and a value of j is a length value of the node list, and perform step 2, step 2: determine whether the start node and the end node are a same node, and end the procedure if the start node and the end node are a same node, or perform step 3 if the start node and the end node are not a same node, step 3: determine whether the start node and the end node are adjacent nodes in the node list, and perform step 4 if the start node and the end node are adjacent nodes in the node list, or perform step 5 if the start node and the end node are not adjacent nodes in the node list, step 4: record an adjacency segment identifier of a path from the start node to the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, step 5: determine whether a path indicated by all nodes arranged in sequence from the start node to the end node in the node list is a unique shortest path from the start node to the end node in the segment routing, and perform step 6 if the path is the unique shortest path, or perform step 7 if the path is not the unique shortest path, step 6: record a node segment identifier of the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, and step 7: update the value of j to j−1, use the $j^{th}$ node in the node list as the end node, and re-perform step 2.

With reference to the first aspect, in a second possible implementation, generating target information of the forwarding path of the data packet based on the initial information includes step 1: obtain a node list of the forwarding path of the data packet, use the $i^{th}$ node in the node list as a start node, use the $j^{th}$ node in the node list as an end node, where a value of i is 1, and a value of j is a length value of the node list, and perform step 2, step 2: determine whether the start node and the end node are a same node, and end the procedure if the start node and the end node are a same node, or perform step 3 if the start node and the end node are not a same node, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: record a node segment identifier of the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, and step 5: update the value of j to j−1, use the $j^{th}$ node in the node list as the end node, and re-perform step 2.

With reference to the first aspect, in a third possible implementation, generating target information of the forwarding path of the data packet based on the initial information includes step 1: obtain a node list of the forwarding path of the data packet, use the $i^{th}$ node in the node list as a start node, use the $j^{th}$ node in the node list as an end node, set a temporary end node to an empty node, where a value of i is 1, and a value of j is i+1, and perform step 2, step 2: determine whether the end node is the last node in the node list, and perform step 10 if the end node is the last node in the node list, or perform step 3 if the end node is not the last node in the node list, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: update the temporary end node to the end node, update the value of j to j+1, use the $j^{th}$ node in the node list as the end node, and re-perform step 2, step 5: determine whether the temporary end node is empty, and perform step 6 if the temporary end node is not empty, or perform step 7 if the temporary end node is empty, step 6: determine whether the temporary end node is an adjacent node of the start node, and perform step 8 if the temporary end node is an adjacent node of the start node, or perform step 9 if the temporary end node is not an adjacent node of the start node, step 7: record, in the target information, an adjacency segment identifier used to indicate a path from the start node to the end node, update the value of i to be equal to the value of j, update the value of j to j+1, use the $i^{th}$ node in the node list as the start node, use the $j^{th}$ node in the node list as the end node, and re-perform step 2, step 8: record an adjacency segment identifier of a path from the start node to the temporary end node in the target information, update the value of i to be equal to j−1, update the value of j to j, use the $i^{th}$ node in the node list as the start node, use the $j^{th}$ node in the node list as the end node, set the temporary end node to be empty, and re-perform step 2, step 9: record a node segment identifier of the temporary end node in the target information, update the value of i to be equal to j−1, update the value of j to j, use the $i^{th}$ node in the node list as the start node, use the $j^{th}$ node in the node list as the end node, set the temporary end node to be empty, and re-perform step 2, step 10: determine whether the start node is the penultimate node in the node list, and perform step 11 if the start node is not the penultimate node in the node list, or perform step 12 if the start node is the penultimate node in the node list, step 11: record, in the target information, a node segment identifier corresponding to the end node, and end the procedure, and step 12: record, in the target information, an adjacency segment identifier used to indicate a path from the start node to the end node, and end the procedure.

With reference to the first aspect, in a fourth possible implementation, generating target information of the forwarding path of the data packet based on the initial information includes step 1: obtain a node list of the forwarding path of the data packet, use the $i^{th}$ node in the node list as a start node, use the $j^{th}$ node in the node list as an end node, set a temporary end node to an empty node, where a value of i is 1, and a value of j is i+1, and perform step 2, step 2: determine whether the end node is the last node in the node list, and perform step 8 if the end node is the last node in the node list, or perform step 3 if the end node is not the last node in the node list, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: update the temporary end node to the end node, update the value of j to j+1, use the $j^{th}$ node in the node list as the end node, and re-perform step 2, step 5: determine whether the temporary end node is empty, and perform step 6 if the temporary end node is not empty, or perform step 7 if the temporary end node is empty, step 6: record a node segment identifier of the temporary end node in the target information, update the value of i to be equal to i−1, update the value of j to j, use the $i^{th}$ node in the node list as the start node, use the $j^{th}$ node in the node list as the end node, set the temporary end node to be empty, and re-perform step 2, step 7: record, in the target information, an adjacency segment identifier used to indicate a path from the start node to the end node, update the value of i to be equal to the value of j, update the value of j to j+1, use the $i^{th}$ node in the node list as the start node, use the $j^{th}$ node in the node list as the end node, and re-perform step 2, step 8: determine whether the start node is the penultimate node in the node list, and perform step 9 if the start node is not the penultimate node in the node list, or perform step 10 if the start node is the penultimate node in the node list, step 9: record a node segment identifier of the end node in the target information, and end the procedure, and step 10: record, in the target information, an adjacency segment identifier used to indicate a path from the start node to the end node, and end the procedure.

With reference to any one of the first aspect or the first to the fourth possible implementations, in a fifth possible implementation, the initial information is an adjacency segment identifier list, that is, the path identifier in the initial information is an adjacency segment identifier.

With reference to any one of the first aspect or the first to the fifth possible implementations, in a sixth possible implementation, the method is performed by an ingress node on the forwarding path of the data packet, and the method further includes sending the data packet based on the target information, where the data packet includes the target information.

With reference to any one of the first aspect or the first to the fifth possible implementations, in a seventh possible implementation, the method further includes sending, by a controller, the target information to an ingress node on the forwarding path of the data packet such that the ingress node sends, based on the target information, the data packet including the target information.

According to a second aspect, an apparatus for obtaining information about a forwarding path of a data packet in segment routing is provided. The apparatus includes a module configured to perform the method according to any one of the first aspect or the possible implementations of the first aspect.

According to a third aspect, an apparatus for obtaining information about a forwarding path of a data packet in segment routing is provided. The apparatus includes a processor, the processor is configured to execute a program, and when the processor executes the program, the method according to any one of the first aspect or the possible implementations of the first aspect is implemented.

Optionally, the apparatus may further include a memory. The memory is configured to store the program executed by the processor.

Optionally, the apparatus may further include a receiver. The receiver is configured to receive information from another device or apparatus.

Optionally, the apparatus may further include a transmitter. The transmitter is configured to send information to another device or apparatus.

An example of the apparatus is a network node or a network controller.

According to a fourth aspect, a computer-readable storage medium is provided. The computer-readable storage medium stores program code executed by a communications apparatus or a communications device, and the program code includes an instruction that is used to implement the method according to any one of the first aspect or the possible implementations of the first aspect is implemented.

According to a fifth aspect, a chip is provided. The chip includes a processor and a communications interface. The communications interface is configured to communicate with an external device. The processor is configured to perform the method according to any one of the first aspect or the possible implementations of the first aspect.

Optionally, the chip may further include a memory. The memory stores an instruction. The processor is configured to execute the instruction stored in the memory. When the instruction is executed, the processor is configured to implement the method according to any one of the first aspect or the possible implementations of the first aspect.

Optionally, the chip may be integrated into a network node or a network controller.

According to a sixth aspect, an embodiment of this application provides a computer program product including an instruction. When the instruction is run on a computer, the computer is enabled to perform the method according to the first aspect.

BRIEF DESCRIPTION OF DRAWINGS

FIG. 1 is a schematic architectural diagram of a communications system to which a method and an apparatus in embodiments of this application may be applied;

FIG. 2 is an example flowchart of a method for obtaining information about a forwarding path of a data packet according to an embodiment of this application;

DESCRIPTION OF EMBODIMENTS

Figure 3:
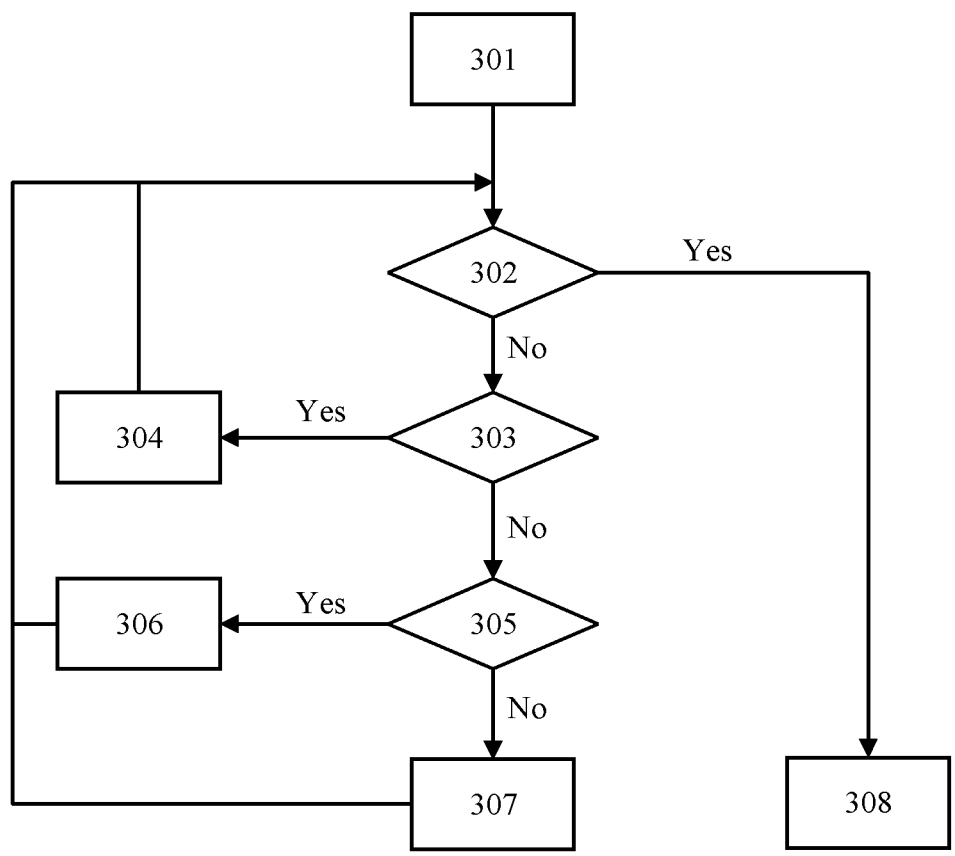
FIG. 3 is an example flowchart of a method for obtaining information about a forwarding path of a data packet according to another embodiment of this application.

The following describes technical solutions of this application with reference to accompanying drawings.

FIG. 1 is a schematic architectural diagram of a communications system to which a method and an apparatus in the embodiments of this application may be applied. It should be understood that FIG. 1 is an example. A quantity of nodes that may be included in the communications system to which the method and the apparatus in the embodiments of this application may be applied and a connection relationship between the nodes may not be limited thereto. The nodes may be connected in a wired manner or in a wireless manner.

A multiprotocol label switching (MPLS) data plane or an IPv6, may be applied to the communications system shown in FIG. 1.

Any one of the nodes included in the communications system to which the method and the apparatus in the embodiments of this application may be applied, for example, a node A, a node B, a node C, a node D, a node N, a node O, a node P, and a node Z may be a router, a switch, or any network device that can support SR.

In a network structure shown in FIG. 1, a network controller may calculate a path through which a data packet needs to pass. Path information of the path through which the data packet needs to pass may be indicated using an IP address, a SID, or the like of a node on the path.

It should be understood that in this application, a forwarding path of a data packet may be referred to as a tunnel of the data packet. A set including data packets may be referred to as a data flow.

There are mainly three types of SIDs in the SR: a prefix-SID, a node-SID, and an adjacency-SID (adj-SID).

The adjacency-SID may be used to forward the data packet to a corresponding adjacent node through a specified link. Therefore, in a scenario in which the data packet needs to be forwarded according to a specified path in SR-traffic engineering (TE), each SID in a SID list is an adj-SID.

For example, in the network structure shown in FIG. 1, MPLS is used as an example. When a forwarding path of a data packet is A→B→C→P→Z, an adj-SID between the node A and the node B is 9101, an adj-SID between the node B and the node C is 9105, an adj-SID between the node C and the node O is 9107, an adj-SID between the node O and the node P is 9103, and an adj-SID between the node P and the node Z is 9105, a SID list of the data packet may sequentially include {9101, 9105, 9107, 9103, 9105}.

As an ingress node on the forwarding path of the data packet, after obtaining the SID list, the node A may send the data packet to the node B according to 9101 in the SID list, and the data packet includes a SID list {9105, 9107, 9103, 9105}. After receiving the data packet sent by the node A, the node B may send the data packet to the node C according to 9105 in the SID list {9105, 9107, 9103, 9105}, and the data packet includes a SID list {9107, 9103, 9105}. After receiving the data packet sent by the node B, the node C may send the data packet to the node O according to the SID list {9107, 9103, 9105}, and the data packet includes a SID list {9103, 9105}. After receiving the data packet sent by the node C, the node O may send the data packet to the node P according to the SID list {9103, 9105}, and the data packet includes a SID list {9105}. After receiving the data packet from the node O, the node P may send the data packet to the node Z according to the SID list {9105}.

That information about the forwarding path of the data packet is an adjacent SID list, that is, an identifier (or a label) of the forwarding path of the data packet is an adjacent SID is used as an example above to describe a process of forwarding the data packet according to the path information. When the information about the forwarding path of the data packet includes other path identifier, a data packet forwarding process is similar.

Accordingly, the foregoing process demonstrates that, if a network scale is large and an SR-tunnel is long, the information (for example, the SID list) about the forwarding path of the data packet is long. Excessively long path information reduces transmission efficiency between nodes, and consequently, network transmission performance is affected.

To reduce a length of the information about the forwarding path of the data packet, improve transmission efficiency between nodes, and improve network transmission performance, this application provides a new method for obtaining the information about the forwarding path of the data packet in SR.

FIG. 2 is a schematic flowchart of a method for obtaining information about a forwarding path of a data packet in SR according to an embodiment of this application. It should be understood that FIG. 2 shows steps or operations of the method, but these steps or operations are examples. In this embodiment of this application, other operations or variations of the operations in FIG. 2 may be further performed.

S201: Obtain initial information of a forwarding path of a data packet, where the initial information includes a plurality of path identifiers.

For example, nodes included in a path through which the data packet needs to pass are calculated based on a constraint condition, and identifiers of these nodes (for example, an IP address of a node, or a SID or another identifier of a node) are used as path identifiers, to form the initial information of the forwarding path of the data packet. That is, the initial information including the identifiers of the nodes may indicate the forwarding path of the data packet.

For another example, nodes included in a path through which the data packet needs to pass are calculated based on a constraint condition, and an adj-SID between these nodes is used as a path identifier, to form the initial information of the forwarding path of the data packet. That is, the initial information including the adj-SID between these nodes may indicate the forwarding path of the data packet.

For example, in SR-TE, the nodes included in the path through which the data packet needs to pass are calculated based on the constraint condition such as a bandwidth requirement or a delay requirement.

For example, in SR-MPLS, the initial information may be an adj-ID list. The path in FIG. 1 is used as an example, and the initial information may be {9101, 9105, 9107, 9103, 9105}.

In SR-MPLS, the initial information may alternatively be an IP address (address) list. The path in FIG. 1 is used as an example, and the initial information may be {IP address A, IP address B, IP address C, IP address O, IP address P, IP address Z}.

For another example, in SRv6, the initial information may be an SRv6 SID list, and a SID in the list is an IPv6 address declared as the SID. The path in FIG. 1 is used as an example, and the initial information may be {A::12, B::23, C::34, O::45, P::56, Z::67}.

S202: Generate target information of the forwarding path of the data packet based on the initial information, where the target information includes one or more node segment identifiers, at least one node segment identifier in the target information corresponds to a plurality of path identifiers in the initial information, a first path indicated by a plurality of path identifiers in the initial information that correspond to a node segment identifier in the target information is a unique shortest path from a start node on the first path to an end node on the first path in the segment routing, and each node segment identifier that is in the target information and that corresponds to a plurality of path identifiers in the initial information is a node segment identifier of an end node on a path indicated by all the path identifiers corresponding to the node segment identifier.

A path indicated by the target information is the same as a path indicated by the initial information. In MPLS, the node segment identifier is expressed as a label. In SRv6, the node segment identifier is expressed as an IPv6 address declared as a SID.

In the method, when the first path indicated by the plurality of path identifiers in the initial information is the unique shortest path from the start node on the first path to the end node on the first path, the first path may be indicated using a node-SID of the end node on the first path instead of the plurality of path identifiers, or when the first path indicated by the plurality of path identifiers in the initial information is not the unique shortest path from the start node on the first path to the end node on the first path, the first path may be indicated using an adj-SID between the start node and the end node on the first path. In this case, the node-SID of the end node on the first path and/or the adj-SID between the start node and the end node on the first path form the target information.

In this way, a quantity of path identifiers can be reduced, data packet transmission efficiency can be further improved, and finally, performance of a communications network is improved.

For example, when an initial SID list of the data packet includes {9101, 9105, 9107, 9103, 9105}, if a path "A→B→C" jointly indicated by the first two SIDs, that is, "9101" and "9105" is a unique shortest path from the node A to the node C, because "9101" and "9105" that are used as a whole are the first SID in the initial SID list of the data packet, the first SID in a target SID list of the data packet may be a SID of the node C.

For another example, if a path "O→P→Z" jointly indicated by the last two SIDs, that is, "9103" and "9105" in an initial SID list of the data packet is a unique shortest path from the node O to the node Z, because "9103" and "9105" that are used as a whole are the fourth SID in the initial SID list of the data packet, the fourth SID in a target SID list of the data packet may be a SID of the node Z.

The target information of the forwarding path of the data packet may be determined based on the initial information of the forwarding path of the data packet in a plurality of implementations.

FIG. 3 shows an implementation in which the target information of the forwarding path of the data packet is determined based on the initial information of the forwarding path of the data packet.

S301: Obtain a node list of the forwarding path of the data packet, use the first node in the node list as a start node, use the last node in the node list as an end node, obtain an empty list, and use the empty list as a temporary path information list.

S302: Determine whether the start node and the end node are a same node, and perform S308 if the start node and the end node are a same node, or perform S303 if the start node and the end node are not a same node.

S303: Determine whether the start node and the end node are adjacent nodes in the node list, and perform S304 if the start node and the end node are adjacent nodes in the node list, or perform S305 if the start node and the end node are not adjacent nodes in the node list.

S304: Record an adjacency segment identifier of a path from the start node to the end node in the target information, use the end node as a new start node, use the last node in the node list as a new end node, and re-perform S302.

S305: Determine whether a path indicated by all nodes arranged in sequence from the start node to the end node in the node list is a unique shortest path from the start node to the end node in the SR, and perform S306 if the path is the unique shortest path, or perform S307 if the path is not the unique shortest path.

S306: Add a node segment identifier corresponding to the end node to the temporary path information list, use the end node as a new start node, use the last node in the node list as a new end node, and re-perform S302.

S307: Use the first node before the end node in the node list as a new end node, and re-perform S302.

S308: Use the temporary path information list as the target information.

That the initial information is an adj-SID list used to indicate a path through which the data packet passes and the adj-SID list includes a plurality of adj-SIDs is used as an example below to describe a pseudocode implementation of generating the target information based on the initial information in this application. Executing the pseudocode may implement the method shown in FIG. 3.

```
node = strict[0]; j = len(strict) − 1; last = strict[j];
while (node != last):
if strict[j−1] == node:
loose.add(adj_sid(node, last))
node = last
j = len(strict) − 1
last = strict[j]
    else:
        paths = SPT(node, last)
        if len(paths) == 1 and paths = strict[index(node):index(last)]:
            loose.add(node_sid(last))
            node = last
            j = len(strict) − 1
            last = strict[j]
        else:
            last = strict[j−−]
return loose
```

In the pseudocode, strict[ ] indicates the node list corresponding to the path identified by the initial information, loose[ ] indicates the temporary path information list, node indicates the start node, last indicates the end node, SPT (node, last) indicates to obtain a shortest path from the start node to the end node in the SR, adj_sid(node, last) indicates to obtain an adj-SID between node and last in the adj-SID list, loose.add(adj_sid(node, last)) indicates to add the adj-SID between node and last in the adj-SID list to loose, and node_sid(node) indicates to obtain a node-SID of node.

The SR shown in FIG. 1 is used as an example. The initial information of the forwarding path of the data packet includes {9101, 9105, 9107, 9103, 9105}. The target information that may be obtained according to the method shown in FIG. 3 or the foregoing pseudocode may include {SID of the node C, 9107, SID of the node Z}.

Figure 4:
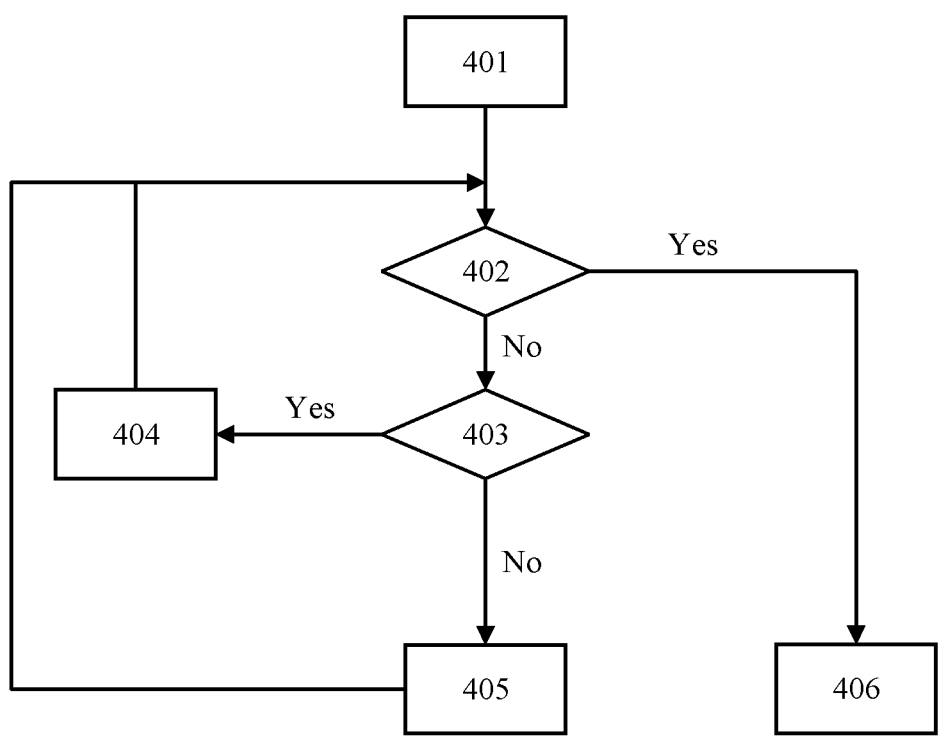
FIG. 4 is an example flowchart of a method for obtaining information about a forwarding path of a data packet according to another embodiment of this application.

FIG. 4 shows another implementation in which the target information of the forwarding path of the data packet is determined based on the initial information of the forwarding path of the data packet.

S401: Obtain a node list of the forwarding path of the data packet, use the first node in the node list as a start node, use the last node in the node list as an end node, obtain an empty list, and use the empty list as a temporary path information list.

S402: Determine whether the start node and the end node are a same node, and perform S406 if the start node and the end node are a same node, or perform S403 if the start node and the end node are not a same node.

S403: Determine whether a path indicated by all nodes arranged in sequence from the start node to the end node in the node list is a unique shortest path from the start node to the end node in the SR, and perform S404 if the path is the unique shortest path, or perform S405 if the path is not the unique shortest path.

S404: Add a node segment identifier corresponding to the end node to the temporary path information list, use the end node as a new start node, use the last node in the node list as a new end node, and re-perform S402.

S405: Use the first node before the end node in the node list as a new end node, and re-perform S402.

S406: Use the temporary path information list as the target information.

That the initial information is an adj-SID list used to indicate a path through which the data packet passes and the adj-SID list includes a plurality of adj-SIDs is used as an example below to describe a pseudocode implementation of generating the target information based on the initial information in this application. Executing the pseudocode may implement the method shown in FIG. 4.

```
node = strict[0]; j = len(strict) − 1; last = strict[j];
while (node != last):
    paths = SPT(node, last)
    if len(paths) == 1 and paths = strict[index(node):index(last)]:
        loose.add(node_sid(last))
        node = last
        j = len(strict) − 1
        last = strict[j]
    else:
        last = strict[j−−]
return loose
```

In the pseudocode, strict[ ] indicates the node list corresponding to the path identified by the initial information, loose[ ] indicates the temporary path information list, node indicates the start node, last indicates the end node, SPT (node, last) indicates to obtain a shortest path from the start node to the end node in the SR, adj_sid(node, last) indicates to obtain an adj-SID between node and last in the adj-SID list, loose.add(adj_sid(node, last)) indicates to add the adj-SID between node and last in the adj-SID list to loose, and node_sid(node) indicates to obtain a node-SID of node.

The SR shown in FIG. 1 is used as an example. The initial information of the forwarding path of the data packet includes {9101, 9105, 9107, 9103, 9105}. The target information that may be obtained according to the method shown in FIG. 4 or the foregoing pseudocode may include {SID of the node C, SID of the node O, SID of the node Z}.

It should be understood that the temporary path information list used in the methods shown in FIG. 3 and FIG. 4 is an example, and the temporary path information list may not be used to obtain the target information.

Figure 5:
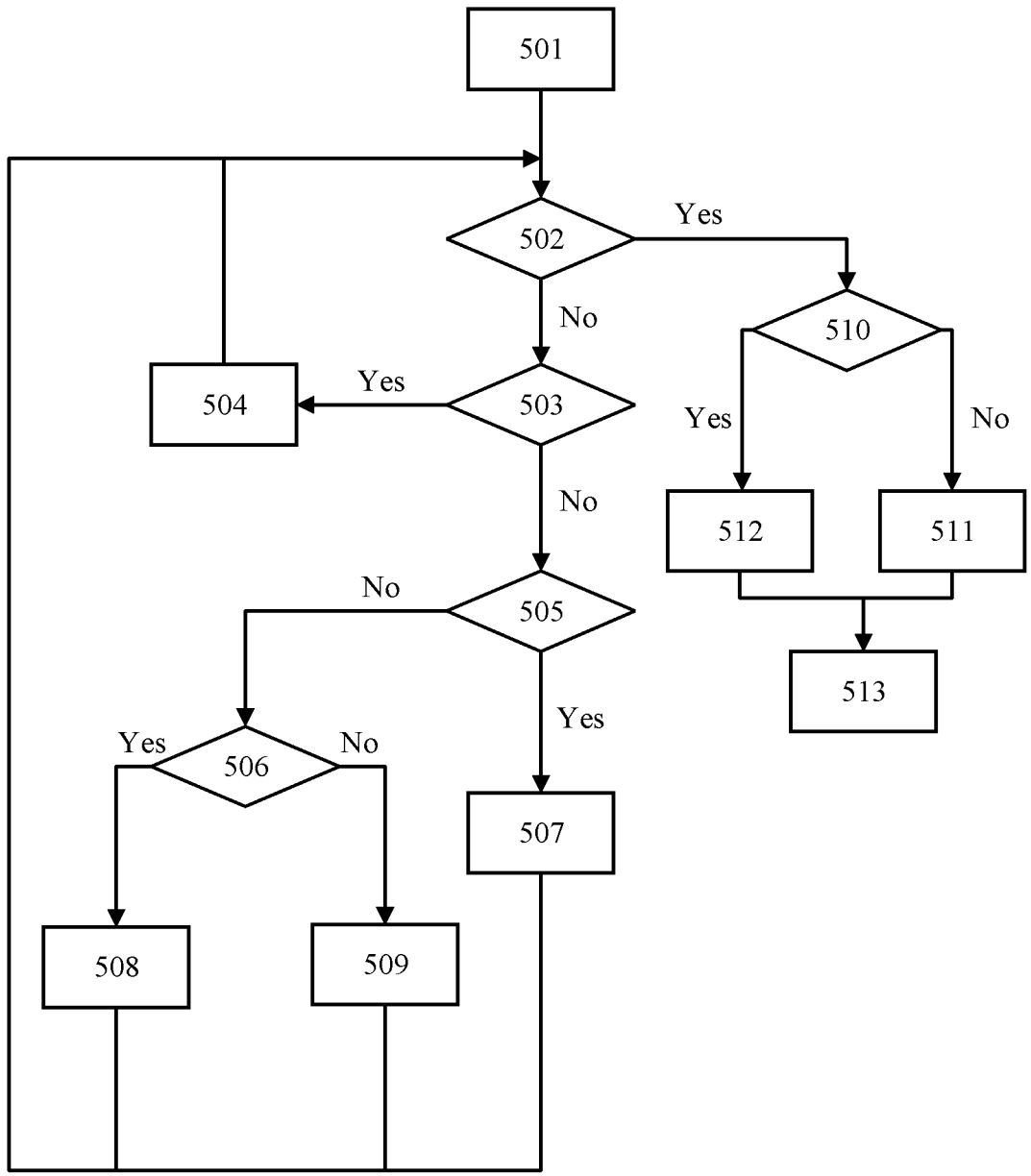
FIG. 5 is an example flowchart of a method for obtaining information about a forwarding path of a data packet according to another embodiment of this application.

FIG. 5 shows another implementation in which the target information of the forwarding path of the data packet is determined based on the initial information of the forwarding path of the data packet.

S501: Obtain a node list corresponding to a path identified by the initial information, use the first node in the node list as a start node, use the first node after the start node in the node list as an end node, use an empty list as a temporary path information list, and use an empty node as a temporary end node.

S502: Determine whether the end node is the last node in the node list, and perform S510 if the end node is the last node in the node list, or perform S503 if the end node is not the last node in the node list.

S503: Determine whether a path indicated by all nodes arranged in sequence from the start node to the end node in the node list is a unique shortest path from the start node to the end node in the SR, and perform S504 if the path is the unique shortest path, or perform S505 if the path is not the unique shortest path.

S504: Use the end node as the temporary end node, use the first node after the end node in the node list as a new end node, and perform S502.

S505: Determine whether the temporary end node is empty, and perform S506 if the temporary end node is not empty, or perform S507 if the temporary end node is empty.

S506: Determine whether the temporary end node is an adjacent node of the start node, and perform S508 if the temporary end node is an adjacent node of the start node, or perform S509 if the temporary end node is not an adjacent node of the start node.

S507: Add an adjacency segment identifier used to indicate a path from the start node to the end node to the temporary path information list, use the end node as a new start node, use the first node after the end node in the node list as a new end node, and perform S502.

S508: Add an adjacency segment identifier used to indicate a path from the start node to the temporary end node to the temporary path information list, use the temporary end node as a new start node, set the temporary end node to be empty, and perform S502.

S509: Add a node segment identifier corresponding to the temporary end node to the temporary path information list, use the temporary end node as a new start node, set the temporary end node to be empty, and perform S502.

S510: Determine whether the start node is the penultimate node in the node list, and perform S511 if the start node is not the penultimate node in the node list, or perform S512 if the start node is the penultimate node in the node list.

S511: Add a node segment identifier corresponding to the end node to the temporary path information list, and perform S513.

S512: Add an adjacency segment identifier used to indicate a path from the start node to the end node to temporary path information list, and perform S513.

S513: Use the temporary path information list as the target information.

That the initial information is an adj-SID list used to indicate a path through which the data packet passes and the adj-SID list includes a plurality of adj-SIDs is used as an example below to describe a pseudocode implementation of generating the target information based on the initial information in this application. Executing the pseudocode may implement the method shown in FIG. 5.

```
i = 0; node = strict[i]; next = strict[i + 1]
while(next ! = strict[-1]):
        if in rSPT(next, node) next is the only inherited-parent of node:    Whether next
is a unique iteration parent node in a reverse tree //from next that is used as a root to //node
                TENT = next
                next = strict[i++]
        else:
                if TENT:
                        if TENT is node's neighbor:            //Whether TENT is an adjacent node
of node
                                loose.add(adj_SID(node, TENT)
                        else:
                                loose.add(node_SID(TENT))
                        node = TENT
                        TENT = null
                else:
                        loose.add(adj_SID(node, next))
                        node = next
                        next = strict[i++]
        if node ! = strict[-2]:
                loose.add(node_SID(next))
        else:
                loose.add(adj_SID(node,next)
        return loose
```

In the pseudocode, strict[ ] indicates the node list corresponding to the path identified by the initial information, loose[ ] indicates the temporary path information list, node indicates the start node, TEN indicates the temporary end node, next indicates the end node, adj_SID(node, next) indicates to obtain an adj-SID between node and next in an adj-SID list, loose.add(adj_SID(node, TENT)) indicates to add an adj-SID between node and TENT in the adj-SID list to loose, node_SID(TENT) indicates to obtain a node-SID of TENT, and loose.add(node_SID(next)) indicates to add the node-SID of TENT to loose.

The SR shown in FIG. 1 is used as an example. The initial information of the forwarding path of the data packet includes {9101, 9105, 9107, 9103, 9105}. The target information that may be obtained according to the method shown in FIG. 5 or the foregoing pseudocode may include {SID of the node C, 9107, SID of the node Z}.

Figure 6:
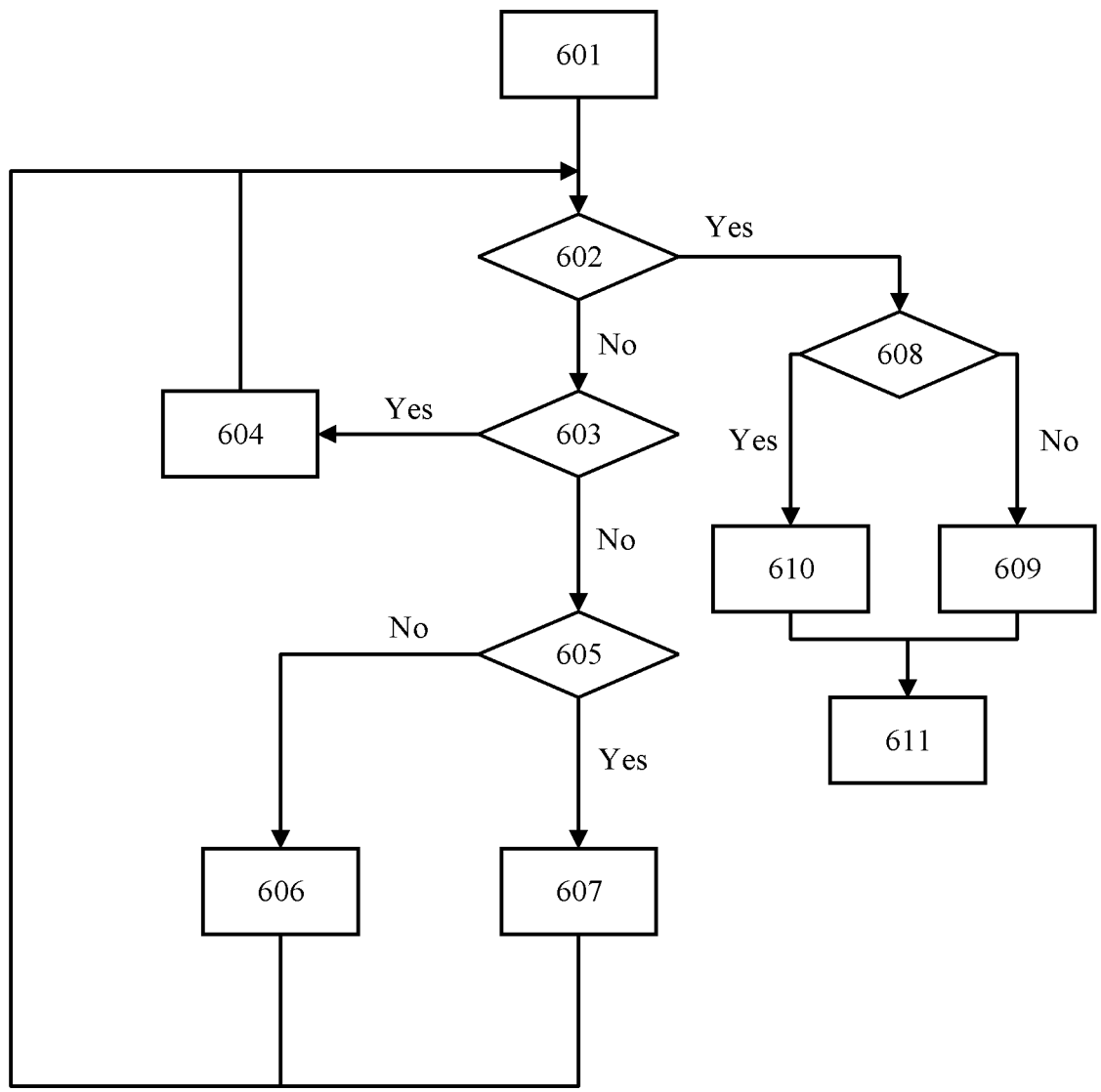
FIG. 6 is an example flowchart of a method for obtaining information about a forwarding path of a data packet according to another embodiment of this application.

FIG. 6 shows another implementation in which the target information of the forwarding path of the data packet is determined based on the initial information of the forwarding path of the data packet.

S601: Obtain a node list corresponding to a path identified by the initial information, use the first node in the node list as a start node, use the first node after the start node in the node list as an end node, use an empty list as a temporary path information list, and use an empty node as a temporary end node.

S602: Determine whether the end node is the last node in the node list, and perform S608 if the end node is the last node in the node list, or perform S603 if the end node is not the last node in the node list.

S603: Determine whether a path indicated by all nodes arranged in sequence from the start node to the end node in the node list is a unique shortest path from the start node to the end node in the SR, and perform S604 if the path is the unique shortest path, or perform S605 if the path is not the unique shortest path.

S604: Use the end node as the temporary end node, use the first node after the end node in the node list as a new end node, and perform S602.

S605: Determine whether the temporary end node is empty, and perform S606 if the temporary end node is not empty, or perform S607 if the temporary end node is empty.

S606: Add a node segment identifier corresponding to the temporary end node to the temporary path information list, use the temporary end node as a new start node, set the temporary end node to be empty, and perform S602.

S607: Add an adjacency segment identifier used to indicate a path from the start node to the end node to the temporary path information list, use the end node as a new start node, use the first node after the end node in the node list as a new end node, and perform S602.

S608: Determine whether the start node is the penultimate node in the node list, and perform S609 if the start node is not the penultimate node in the node list, or perform S610 if the start node is the penultimate node in the node list.

S609: Add a node segment identifier corresponding to the end node to the temporary path information list, and perform S611.

S610: Add an adjacency segment identifier used to indicate a path from the start node to the end node to temporary path information, and perform S611.

S611: Use the temporary path information list as the target information.

That the initial information is an adj-SID list used to indicate a path through which the data packet passes and the adj-SID list includes a plurality of adj-SIDs is used as an example below to describe a pseudocode implementation of generating the target information based on the initial information in this application. Executing the pseudocode may implement the method shown in FIG. 6.

add an adj-SID between node and TENT in the adj-SID list to loose, node_SID(TENT) indicates to obtain a node-SID of TENT, and loose.add(node_SID(next)) indicates to add the node-SID of TENT to loose.

The SR shown in FIG. 1 is used as an example. The initial information of the forwarding path of the data packet includes {9101, 9105, 9107, 9103, 9105}. The target information that may be obtained according to the method shown in FIG. 6 or the foregoing pseudocode may include {SID of the node C, SID of the node O, SID of the node Z}.

It should be understood that the temporary path information list and/or the temporary end node used in the methods shown in FIG. 5 and FIG. 6 is an example, and the temporary path information list and/or the temporary end node may not be used to obtain the target information.

In this embodiment of this application, optionally, the methods in FIG. 2 to FIG. 6 may be performed by an ingress node of the path through which the data packet passes, or may be performed by a controller in a network.

It should be understood that the methods shown in FIG. 3 to FIG. 6 are examples, and a method obtained after a step in any one of the methods shown in FIG. 3 to FIG. 6 are changed or improved also falls within the protection scope of this application.

If the methods in FIG. 2 to FIG. 6 are performed by the ingress node of the path through which the data packet passes, the method in this embodiment of this application may further include sending, by the ingress node, the data packet based on the target information, where the data packet includes the target information. If the methods in FIG. 2 to FIG. 6 are performed by the controller of the path through which the data packet passes, the method in this embodiment of this application may further include sending, by the controller, the target information to the ingress node of the path through which the data packet passes, and sending, by the ingress node, the data packet based on the target information, where the data packet includes the target information. The controller may be a path computation client (PCE), or another server running this algorithm.

```
i = 0; node = strict[i]; next = strict[i + 1]
while(next ! = strict[-1]):
    if in rSPT(next, node) is the only inherited-parent of node:   Whether next
is a unique iteration parent node in a reverse tree //from next that is used as a root to //node
        TENT = next
        next = strict[i++]
    else:
        if TENT:
            loose.add(node_SID(TENT))
            node = TENT
            TENT = null
        else:
            loose.add(adj_SID(node, next))
            node = next
            next = strict[i++]
if node ! = strict[-2]:
    loose.add(node_SID(next))
else:
    loose.add(adj_SID(node,next))
return loose
```

In the pseudocode, strict[ ] indicates the node list corresponding to the path identified by the initial information, loose[ ] indicates the temporary path information list, node indicates the start node, TEN indicates the temporary end node, next indicates the end node, ad_SID(node, next) indicates to obtain an adj-SID between node and next in an adj-SID list, loose.add(adj_SID(node, TENT)) indicates to That "A→B→C→P→Z" shown in FIG. 1 is used as the forwarding path of the data packet and the method shown in FIG. 3 are used as an example below to describe a procedure of sending the data packet based on the target information obtained according to the method in this application. Accordingly, the procedure demonstrates that when the data packet is forwarded based on the target information obtained according to the method in this application, a length of information about a forwarding path of the data packet between nodes can be reduced, to improve communication efficiency.

For example, when initial information obtained by the node A is an adj-ID list {9101, 9105, 9107, 9103, 9105} or an IP address list {IP address A, IP address B, IP address C, IP address O, IP address P, IP address Z}, the target information may be {node-SID of C, adj-SIDs of C to O, node-SID of Z}. Assuming that a node-SID of C is 1003, and a node-SID of Z is 1008, the target information is {1003, 9107, 1008}.

The node A may search a forwarding table on the node A based on the node-SID of C, learn that a next hop is the node B, and send a data packet to the node B. The data packet carries path information, and the path information is {node ID of C, adj-IDs of C to O, node ID of Z}. After receiving the data packet from the node A, the node B queries a forwarding table on the node B, learns that a next hop is the node C, and sends a data packet to the node C. The data packet carries path information. At this time, the path information may be {node ID of C, adj-IDs of C to O, node ID of Z}, or may be {adj-IDs of C to O, node ID of Z}. After receiving the data packet from the node B, the node C queries a forwarding table on the node C based on "adj-IDs of C to O", finds that a next hop is the node O, and sends a data packet to the node O. The data packet includes path information, and the path information is {node ID of Z}. After receiving the data packet from the node B, the node O queries a forwarding table on the node O, determines that a next hop is the node P, and sends a data packet to the node P. The data packet includes path information, and the path information is {node ID of Z}. After receiving the data packet from the node O, the node P queries a forwarding table on the node P, determines that a next hop is the node Z, and sends a data packet to the node Z.

For example, the initial information is the SRv6 SID list, and the SIDs in the list are IPv6 addresses declared as the SIDs. For example, when the initial information is {A::12, B::23, C::34, O::45, P::56, Z::67}, after the pseudocode is processed or run according to the method shown in FIG. 3, the target information may be {node ID of C, adj-IDs of C to O, node ID of Z}. For example, the target information may be {C::1, C::34, Z::1}.

Then, the node A sends a data packet to the node B based on C::1. The data packet includes path information, and the path information includes {C::1, C::34, Z::1}. A subsequent forwarding procedure complies with the SRv6 forwarding procedure. For simplicity, details are not described herein again.

In the methods in FIG. 3 to FIG. 6, corresponding node-SIDs in the target information can be used to indicate all path identifiers in the initial information that correspond to the unique shortest path such that a quantity of path identifiers in the target information can be reduced to a maximum extent, that is, a length of the target information can be reduced.

Certainly, when the method in this embodiment of this application is performed, a maximum length of the target information that can be accepted may be determined based on a requirement, and then the target information is determined based on the maximum length. The maximum length of the target information that can be accepted may be determined based on a maximum insertion capability of the controller or the ingress node in terms of a path identifier (or referred to as a label).

For example, when some path identifiers in the initial information may be replaced with corresponding node-SIDs in the target information, and the quantity of path identifiers in the target information has been less than or equal to the maximum insertion capability of the controller or the ingress node, whether a path identifier in the initial information still needs to be indicated using a corresponding node-SID may not need to be further detected.

Accordingly, the foregoing analysis demonstrates that according to the method in this embodiment of this application, to reduce the quantity of path identifiers indicating the forwarding path of the data packet, a quantity of insertion times of the controller or the ingress node can also be reduced, to improve performance of the controller or the ingress node.

Figure 7:
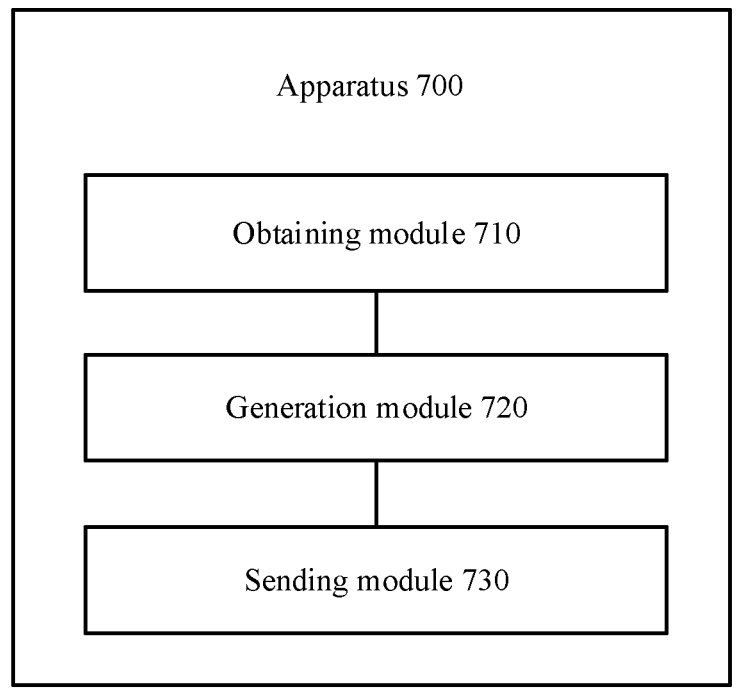
FIG. 7 is an example structural diagram of an apparatus for obtaining information about a forwarding path of a data packet according to an embodiment of this application.

FIG. 7 is schematic block diagram of an apparatus 700 for obtaining information about a forwarding path of a data packet according to an embodiment of this application. It should be understood that the apparatus 700 is an example. The apparatus in this embodiment of this application may further include another module or unit, or include a module with a function similar to that of each module in FIG. 7, or does not necessarily include all modules in FIG. 7.

An obtaining module 710 is configured to obtain initial information of the forwarding path of the data packet. The initial information includes a plurality of path identifiers.

A generation module 720 is configured to generate target information of the forwarding path of the data packet based on the initial information, where the target path information includes one or more node segment identifiers, at least one node segment identifier in the target information corresponds to a plurality of path identifiers in the initial information, a first path indicated by a plurality of path identifiers in the initial information that correspond to a node segment identifier in the target information is a unique shortest path from a start node on the first path to an end node on the first path in segment routing, and each node segment identifier that is in the target information and that corresponds to a plurality of path identifiers in the initial information is a node segment identifier of an end node on a path indicated by all the path identifiers corresponding to the node segment identifier.

Optionally, the generation module is further configured to perform the following steps: step 1: obtain a node list of the forwarding path of the data packet, use the $i^{th}$ node in the node list as a start node, use the $j^{th}$ node in the node list as an end node, where a value of i is 1, and a value of j is a length value of the node list, and perform step 2, step 2: determine whether the start node and the end node are a same node, and end the procedure if the start node and the end node are a same node, or perform step 3 if the start node and the end node are not a same node, step 3: determine whether the start node and the end node are adjacent nodes in the node list, and perform step 4 if the start node and the end node are adjacent nodes in the node list, or perform step 5 if the start node and the end node are not adjacent nodes in the node list, step 4: record an adjacency segment identifier of a path from the start node to the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, step 5: determine whether a path indicated by all nodes arranged in sequence from the start node to the end node in the node list is a unique shortest path from the start node to the end node in the segment routing, and perform step 6 if the path is the unique shortest path, or perform step 7 if the path is not the unique shortest path, step 6: record a node segment identifier of the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, and step 7: update the value of j to i−1, use the $j^{th}$ node in the node list as the end node, and re-perform step 2.

Optionally, the generation module is further configured to perform the following steps: step 1: obtain a node list of the forwarding path of the data packet, use the $i^{th}$ node in the node list as a start node, use the $j^{th}$ node in the node list as an end node, where a value of i is 1, and a value of j is a length value of the node list, and perform step 2, step 2: determine whether the start node and the end node are a same node, and end the procedure if the start node and the end node are a same node, or perform step 3 if the start node and the end node are not a same node, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: record a node segment identifier of the end node in the target information, update the value of i to be equal to the value of j, update the value of j to be equal to the length value of the node list, use the $i^{th}$ node in the node list as the start node, use the $j^{th}$ node in the node list as the end node, and re-perform step 2, and step 5: update the value of j to i−1, use the $j^{th}$ node in the node list as the end node, and re-perform step 2.

Optionally, the generation module is further configured to perform the following steps: step 1: obtain a node list of the forwarding path of the data packet, use the $i^{th}$ node in the node list as a start node, use the $j^{th}$ node in the node list as an end node, set a temporary end node to an empty node, where a value of i is 1, and a value of j is i+1, and perform step 2, step 2: determine whether the end node is the last node in the node list, and perform step 10 if the end node is the last node in the node list, or perform step 3 if the end node is not the last node in the node list, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: update the temporary end node to the end node, update the value of j to j+1, use the $j^{th}$ node in the node list as the end node, and re-perform step 2, step 5: determine whether the temporary end node is empty, and perform step 6 if the temporary end node is not empty, or perform step 7 if the temporary end node is empty, step 6: determine whether the temporary end node is an adjacent node of the start node, and perform step 8 if the temporary end node is an adjacent node of the start node, or perform step 9 if the temporary end node is not an adjacent node of the start node, step 7: record, in the target information, an adjacency segment identifier used to indicate a path from the start node to the end node, update the value of i to be equal to the value of j, update the value of j to j+1, use the $i^{th}$ node in the node list as the start node, use the $j^{th}$ node in the node list as the end node, and re-perform step 2, step 8: record an adjacency segment identifier of a path from the start node to the temporary end node in the target information, update the value of i to be equal to i−1, update the value of j to j, use the $i^{th}$ node in the node list as the start node, use the $j^{th}$ node in the node list as the end node, set the temporary end node to be empty, and re-perform step 2, step 9: record a node segment identifier of the temporary end node in the target information, update the value of i to be equal to i−1, update the value of j to j, use the $i^{th}$ node in the node list as the start node, use the $j^{th}$ node in the node list as the end node, set the temporary end node to be empty, and re-perform step 2, step 10: determine whether the start node is the penultimate node in the node list, and perform step 11 if the start node is not the penultimate node in the node list, or perform step 12 if the start node is the penultimate node in the node list, step 11: record, in the target information, a node segment identifier corresponding to the end node, and end the procedure, and step 12: record, in the target information, an adjacency segment identifier used to indicate a path from the start node to the end node, and end the procedure.

Optionally, the generation module is further configured to perform the following steps: step 1: obtain a node list of the forwarding path of the data packet, use the $i^{th}$ node in the node list as a start node, use the $j^{th}$ node in the node list as an end node, set a temporary end node to an empty node, where a value of i is 1, and a value of j is i+1, and perform step 2, step 2: determine whether the end node is the last node in the node list, and perform step 8 if the end node is the last node in the node list, or perform step 3 if the end node is not the last node in the node list, step 3: determine whether a path indicated by all nodes arranged in sequence from the start node to the end node in the node list is a unique shortest path from the start node to the end node in the segment routing, and perform step 4 if the path is the unique shortest path, or perform step 5 if the path is not the unique shortest path, step 4: update the temporary end node to the end node, update the value of j to j+1, use the $j^{th}$ node in the node list as the end node, and re-perform step 2, step 5: determine whether the temporary end node is empty, and perform step 6 if the temporary end node is not empty, or perform step 7 if the temporary end node is empty, step 6: record a node segment identifier of the temporary end node in the target information, update the value of i to be equal to i−1, update the value of j to j, use the $i^{th}$ node in the node list as the start node, use the $j^{th}$ node in the node list as the end node, set the temporary end node to be empty, and re-perform step 2, step 7: record, in the target information, an adjacency segment identifier used to indicate a path from the start node to the end node, update the value of i to be equal to the value of j, update the value of j to j+1, use the $i^{th}$ node in the node list as the start node, use the $j^{th}$ node in the node list as the end node, and re-perform step 2, step 8: determine whether the start node is the penultimate node in the node list, and perform step 9 if the start node is not the penultimate node in the node list, or perform step 10 if the start node is the penultimate node in the node list, step 9: record a node segment identifier of the end node in the target information, and end the procedure, and step 10: record, in the target information, an adjacency segment identifier used to indicate a path from the start node to the end node, and end the procedure.

Optionally, the initial information is an adjacency segment identifier list, and the path identifier in the initial information is an adjacency segment identifier.

Optionally, the apparatus 700 is an ingress node of the forwarding path of the data packet. The apparatus 700 further includes a sending module 730 configured to send the data packet based on the target information. The data packet includes the target information.

Optionally, the apparatus 700 is a controller of the segment routing. The apparatus 700 further includes a sending module 730 configured to send the target information to an ingress node on the forwarding path of the data packet.

The apparatus 700 may be configured to perform the steps of the methods described in FIG. 2 to FIG. 6. For brevity, details are not described herein again.

Figure 8:
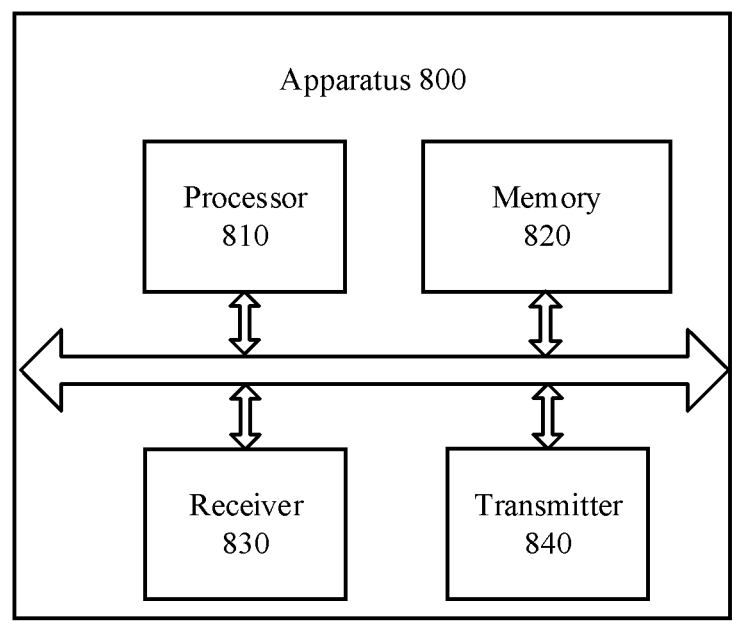
FIG. 8 is an example structural diagram of an apparatus for obtaining information about a forwarding path of a data packet according to another embodiment of this application.

FIG. 8 is a schematic structural diagram of an apparatus for obtaining information about a forwarding path of a data packet according to another embodiment of this application. It should be understood that an apparatus 800 shown in FIG. 8 is an example. The apparatus in this embodiment of this application may further include another module or unit, or include a module with a function similar to that of each module in FIG. 8.

The apparatus 800 may include one or more processors 810, one or more memories 820, a receiver 830, and a transmitter 840. The receiver 830 and the transmitter 840 may be integrated into a transceiver. The memory 820 is configured to store program code executed by the processor 810. The memory 820 may be integrated into the processor 810, or the processor 810 is coupled to one or more memories 820, and is configured to invoke an instruction in the memory 820.

The processor 810 may be configured to implement an operation or a step that can be implemented by the obtaining module 710 and the generation module 720 in FIG. 7, and the transmitter 840 may be configured to implement an operation or a step that can be implemented by the sending module 730 in FIG. 7.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is an example. For example, division into units is logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

It should be understood that, the processor in the embodiments of this application may be a central processing unit (CPU), or may further be another general purpose processor, a digital signal processor (DSP), an application-specific integrated circuit (ASIC), a field-programmable gate array (FPGA), or another programmable logical device, discrete gate or transistor logical device, discrete hardware component, or the like. The general purpose processor may be a microprocessor, or the processor may be any conventional processor, or the like.

When the functions are implemented in the form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
   obtaining initial information of a forwarding path of a data packet in segment routing (SR), wherein the initial information comprises a plurality of first path identifiers; and
   generating target information of the forwarding path based on the initial information, wherein the target information comprises one or more first node segment identifiers, and wherein generating the target information comprises a procedure of:
   obtaining a node list of the forwarding path, setting an $i^{th}$ node in the node list as a first start node, and setting a $j^{th}$ node in the node list as a first end node, wherein a first value of i is 1, and wherein a second value of j is a length value of the node list;
   determining whether the first start node and the first end node are a same node, and ending the procedure in response to determining the first start node and the first end node are the same node;
   determining whether a first path indicated by all nodes arranged in sequence from the first start node to the first end node in the node list is a first unique shortest path from the first start node to the first end node in the SR in response to the first start node and the first end node not being the same node;
   recording a second node segment identifier of the first end node in the target information, updating the first value to be equal to the second value, updating the second value to be equal to the length value, setting the $i^{th}$ node as the first start node, setting the $j^{th}$ node as the first end node, and re-perform determining whether the first start node and the first end node are the same node in response to the first path being the first unique shortest path; and updating the second value to j−1, setting the $j^{th}$ node as the first end node, and re-perform determining whether the first start node and the first end node are the same node in response to the first path not being the first unique shortest path, wherein a third node segment identifier in the first node segment identifiers corresponds to a plurality of second path identifiers in the initial information, and wherein each of the first node segment identifiers corresponding to a plurality of third path identifiers in the initial information is of a corresponding end node on a corresponding path indicated by all the third path identifiers corresponding to each of the first node segment identifiers.

2. The method of claim 1, further comprising:

determining whether the first start node and the second first end node are adjacent nodes in the node list;

either recording an adjacency segment identifier of a second path from the first start node to the first end node in the target information, updating the first value to be equal to the second value, updating the second value to be equal to the length value, setting the $i^{th}$ node as the first start node, setting the $j^{th}$ node as the first end node, and re-perform determining whether the first start node and the first end node are the same node when the first start node and the first end node are the adjacent nodes, or determining whether a third path indicated by all nodes arranged in sequence from the first start node to the first end node in the node list is a second unique shortest path from the first start node to the first end node in the SR when the first start node and the first end node are not the adjacent nodes and are not the same node; and either recording a fourth node segment identifier of the first end node in the target information, updating the first value to be equal to the second value, updating the second value to be equal to the length value, setting the $i^{th}$ node as the first start node, setting the $j^{th}$ node as the second end node, and re-perform determining whether the first start node and the first end node are the same node when the third path is the second unique shortest path or updating the second value to j−1, setting the $j^{th}$ node as the first end node, and re-perform determining whether the first start node and the first end node are the same node when the third path is not the second unique shortest path.

3. The method of claim 1, further comprising a procedure of:

obtaining a second node list of the forwarding path, setting an $i^{th}$ node in the second node list as a second start node, setting a $j^{th}$ node in the second node list as a second end node, and setting a temporary end node to an empty node, wherein a first value of i in the second node list is 1, and wherein a second value of j in the second node list is i+1;

determining whether a second end node is a last node in the second node list, and either determining whether the second start node is a penultimate node in the second node list when the second end node is the last node or determining whether a second path indicated by all nodes arranged in sequence from the second start node to the second end node in the second node list is a second unique shortest path from the second start node to the second end node in the SR when the second end node is not the last node;

either recording, in the target information, a fifth node segment identifier corresponding to the second end node, and ending the procedure when the second start node is not the penultimate node in the second node list or recording, in the target information, a first adjacency segment identifier, and ending the procedure when the second start node is the penultimate node in the second node list;

either updating the temporary end node to the second end node, updating the second value in the second node list to j+1, setting the $j^{th}$ node in the second node list as the second end node, and re-perform determining whether the second end node is the last node in the second node list when the second path is the second unique shortest path or determining whether the temporary end node is empty when the second path is not the second unique shortest path;

either determining whether the temporary end node is an adjacent node of the second start node when the temporary end node is not empty or recording, in the target information, the first adjacency segment identifier indicating a third path from the second start node to the second end node, updating the first value in the second node list to be equal to the second value in the second node list, updating the second value in the second node list to j+1, setting the $i^{th}$ node in the second node list as the second start node, setting the $j^{th}$ node in the second node list as the second end node, and re-perform determining whether the second end node is the last node in the second node list when the temporary end node is empty;

either recording a second adjacency segment identifier of a fourth path from the second start node to the temporary end node in the target information, updating the first value in the second node list to be equal to j−1, updating the second value in the second node list to j, setting the $i^{th}$ node in the second node list as the second start node, setting the $j^{th}$ node in the second node list as the second end node, setting the temporary end node to be empty, and re-perform determining whether the second end node is a last node in the second node list when the temporary end node is the adjacent node of the second start node or recording a fourth node segment identifier of the temporary end node in the target information, updating the first value in the second node list to be equal to j−1, updating the second value in the second node list to j, setting the $i^{th}$ node in the second node list as the second start node, setting the $j^{th}$ node in the second node list as the second end node, setting the temporary end node to be empty, and re-perform determining whether the second end node is the last node in the second node list when the temporary end node is not the adjacent node of the second start node; and recording, in the target information, the first adjacency segment identifier indicating the third path from the second start node to the second end node, updating the first value in the second node list to be equal to the second value in the second node list, updating the second value in the second node list to j+1, setting the $i^{th}$ node in the second node list as the second start node, setting the $j^{th}$ node in the second node list as the second end node, and re-perform determining whether the second end node is the last node in the second node list.

4. The method of claim 1, further comprising a procedure of:
obtaining a second node list of the forwarding path, setting an $i^{th}$ node in the second node list as a second start node, setting a $j^{th}$ node in the second node list as a second end node, and setting a temporary end node to an empty node, wherein a first value of i in the second node list is 1, and wherein a second value of j in the second node list is i+1;
determining whether a second end node is a last node in the second node list, and either determining whether the second start node is a penultimate node in the second node list when the second end node is the last node, or determining whether a second path indicated by all nodes arranged in sequence from the second start node to the second end node in the second node list is a second unique shortest path from the second start node to the second end node in the SR when the second end node is not the last node;
either recording a fifth node segment identifier of the second end node in the target information, and ending the procedure when the second start node is not the penultimate node in the second node list or recording, in the target information, a second adjacency segment identifier indicating a fourth path from the second start node to the second end node, and ending the procedure when the second start node is the penultimate node in the second node list;
either updating the temporary end node to the second end node, updating the second value in the second node list to j+1, setting the $j^{th}$ node in the second node list as the second end node, and re-perform determining whether the second end node is the last node in the second node list when the second path is the second unique shortest path or determining whether the temporary end node is empty when the second path is not the second unique shortest path; and
either recording a fourth node segment identifier of the temporary end node in the target information, updating the first value in the second node list to be equal to j−1, updating the second value in the second node list to j, setting the $i^{th}$ node in the second node list as the second start node, setting the $j^{th}$ node in the second node list as the second end node, setting the temporary end node to be empty, and re-perform determining whether the second end node is the last node in the second node list when the temporary end node is not empty or recording, in the target information, a first adjacency segment identifier indicating a third path from the second start node to the second end node, updating the first value in the second node list to be equal to the second value in the second node list, updating the second value in the second node list to j+1, setting the $i^{th}$ node in the second node list as the second start node, setting the $j^{th}$ node in the second node list as the second end node, and re-perform determining whether the second end node is the last node in the second node list when the temporary end node is empty.

5. The method of claim 1, wherein the initial information comprises an adjacency segment identifier list, and wherein each of the first path identifiers, the second path identifiers, and the third path identifiers is an adjacency segment identifier.

6. The method of claim 1, wherein the method is performed by an ingress node on the forwarding path, wherein the method further comprises sending the data packet based on the target information, and wherein the data packet comprises the target information.

7. The method of claim 1, further comprising sending, by a controller, the target information to an ingress node on the forwarding path.

8. An apparatus comprising:
a memory configured to store a program code; and
a processor coupled to the memory and configured to execute the program code that causes the processor to be configured to:
obtain initial information of a forwarding path of a data packet in segment routing (SR), wherein the initial information comprises a plurality of first path identifiers; and
generate target information of the forwarding path based on the initial information, wherein the target information comprises one or more first node segment identifiers, and wherein generating the target information comprises a procedure of:
obtaining a node list of the forwarding path, setting an $i^{th}$ node in the node list as a first start node, and setting a $j^{th}$ node in the node list as a first end node, wherein a first value of i is 1, and wherein a second value of j is a length value of the node list;
determining whether the first start node and the first end node are a same node, and ending the procedure when the first start node and the first end node are the same node and determining whether a first path indicated by all nodes arranged in sequence from the first start node to the first end node in the node list is a first unique shortest path from the first start node to the first end node in the SR when the first start node and the first end node are not the same node; and
recording a second node segment identifier of the first end node in the target information, updating the first value to be equal to the second value, updating the second value to be equal to the length value, setting the $i^{th}$ node as the first start node, setting the $j^{th}$ node as the first end node, and re-perform determining whether the first start node and the first end node are the same node when the first path is the first unique shortest path and updating the second value to j−1, setting the $j^{th}$ node as the first end node and re-perform determining whether the first start node and the first end node are the same node when the first path is not the first unique shortest path,
wherein a third node segment identifier in the first node segment identifiers corresponds to a plurality of second path identifiers in the initial information, and
wherein each of the first node segment identifiers corresponding to a plurality of third path identifiers in the initial information is of a corresponding end node on a corresponding path indicated by all the third path identifiers corresponding to each of the first node segment identifiers.

9. The apparatus of claim 8, wherein the program code further causes the processor to be configured to perform a procedure in which the processor is configured to perform:
determine whether the first start node and the first end node are adjacent nodes in the node list;
either record an adjacency segment identifier of a second path from the first start node to the first end node in the target information, updating the first value to be equal to the second value, updating the second value to be equal to the length value, setting the $i^{th}$ node as the first start node, setting the $j^{th}$ node as the first end node, and re-perform determining whether the first start node and the first end node are the same node when the first start node and the second end node are the adjacent nodes or determine whether a third path indicated by all nodes arranged in sequence from the first start node to the first end node in the node list is a second unique shortest path from the first start node to the first end node in the SR when the first start node and the first end node are not the adjacent nodes and are not the same node;

either record a fourth node segment identifier of the first end node in the target information, update the first value to be equal to the second value, update the second value to be equal to the length value, set the $i^{th}$ node as the first start node, set the $j^{th}$ node as the second end node, and re-perform determining whether the first start node and the first end node are the same node when the third path is the second unique shortest path or; and update the second value to j−1, set the $j^{th}$ node as the first end node, and re-perform determining whether the first start node and the first end node are the same node when the third path is not the second unique shortest path.

10. The apparatus of claim 8, wherein the program code further causes the processor to be configured to perform a procedure in which the processor is configured to perform:

obtain a second node list of the forwarding path, set an $i^{th}$ node in the second node list as a second start node, set a $j^{th}$ node in the second node list as a second end node, and set a temporary end node to an empty node, wherein a first value of i in the second node list is 1, and wherein a second value of j in the second node list is i+1;

determine whether a second end node is a last node in the second node list, and either determine whether the second start node is a penultimate node in the second node list when the second end node is the last node or determine whether a second path indicated by all nodes arranged in sequence from the second start node to the second end node in the second node list is a second unique shortest path from the second start node to the second end node in the SR when the second end node is not the last node;

either record, in the target information, a fifth node segment identifier corresponding to the second end node, and end the procedure when the second start node is not the penultimate node in the second node list or record, in the target information, a first adjacency segment identifier, and end the procedure when the second start node is the penultimate node in the second node list;

either update the temporary end node to the second end node, update the second value in the second node list to j+1, set the $j^{th}$ node in the second node list as the second end node, and re-perform determining whether the second end node is the last node in the second node list when the second path is the second unique shortest path or determine whether the temporary end node is empty when the second path is not the second unique shortest path;

either determine whether the temporary end node is an adjacent node of the second start node when the temporary end node is not empty or record, in the target information, a first adjacency segment identifier indicating a third path from the second start node to the second end node, update the first value in the second node list to be equal to the second value in the second node list, update the second value in the second node list to j+1, set the $i^{th}$ node in the second node list as the second start node, set the $j^{th}$ node in the second node list as the second end node, and re-perform determining whether the second end node is the last node in the second node list when the temporary end node is empty;

either record a second adjacency segment identifier of a fourth path from the second start node to the temporary end node in the target information, updating the first value in the second node list to be equal to j−1, updating the second value in the second node list to j, setting the $i^{th}$ node in the second node list as the second start node, setting the $j^{th}$ node in the second node list as the second end node, setting the temporary end node to be empty, and re-perform determining whether the second end node is a last node in the second node list when the temporary end node is the adjacent node or record a fourth node segment identifier of the temporary end node in the target information, update the first value in the second node list to be equal to j−1, update the second value in the second node list to j, setting the $i^{th}$ node in the second node list as the second start node, set the $j^{th}$ node in the second node list as the second end node, setting the temporary end node to be empty, and re-perform determining whether the second end node is the last node in the second node list when the temporary end node is not the adjacent node; and record, in the target information, the first adjacency segment identifier indicating the third path from the second start node to the second end node, update the first value in the second node list to be equal to the second value in the second node list, update the second value in the second node list to j+1, setting the $i^{th}$ node in the second node list as the second start node, set the $j^{th}$ node in the second node list as the second end node, and re-perform determining whether the second end node is the last node in the second node list.

11. The apparatus of claim 8, wherein the program code further causes the processor to be configured to perform a procedure in which the processor is configured to perform:

obtain a second node list of the forwarding path, set an $i^{th}$ node in the second node list as a second start node, set a $j^{th}$ node in the second node list as a second end node, and set a temporary end node to an empty node, wherein a first value of i in the second node list is 1, and wherein a second value of j in the second node list is i+1;

determine whether a second end node is a last node in the second node list, and either determine whether the second start node is a penultimate node in the second node list when the second end node is the last node or determine whether a second path indicated by all nodes arranged in sequence from the second start node to the second end node in the second node list is a second unique shortest path from the second start node to the second end node in the SR when the second end node is not the last node;

either record a fifth node segment identifier of the second end node in the target information, and end the procedure when the second start node is not the penultimate node in the second node list or record, in the target information, a second adjacency segment identifier indicating a fourth path from the second start node to the second end node, and end the procedure when the second start node is the penultimate node in the second node list;

either update the temporary end node to the second end node, update the second value in the second node list to j+1, set the j$^{th}$ node in the second node list as the second end node, and re-perform determining whether the second end node is the last node in the second node list when the second path is the second unique shortest path or determine whether the temporary end node is empty when the second path is not the second unique shortest path; and either record a fourth node segment identifier of the temporary end node in the target information, update the first value in the second node list to be equal to j−1, update the second value in the second node list to j, setting the i$^{th}$ node in the second node list as the second start node, set the j$^{th}$ node in the second node list as the second end node, set the temporary end node to be empty, and re-perform determining whether the second end node is the last node in the second node list when the temporary end node is not empty or record, in the target information, a first adjacency segment identifier indicating a third path from the second start node to the second end node, update the first value in the second node list to be equal to the second value in the second node list, update the second value in the second node list to j+1, set the i$^{th}$ node in the second node list as the second start node, setting the j$^{th}$ node in the second node list as the second end node, and re-perform determining whether the second end node is the last node in the second node list when the temporary end node is empty.

12. The apparatus of claim 8, wherein the initial information comprises an adjacency segment identifier list, and wherein each of the first path identifiers, the second path identifiers, and the third path identifiers is an adjacency segment identifier.

13. The apparatus of claim 8, wherein the apparatus is an ingress node on the forwarding path, wherein the apparatus further comprises a transmitter coupled to the processor and configured to send the data packet based on the target information, and wherein the data packet comprises the target information.

14. The apparatus of claim 8, wherein the apparatus is a controller of the SR, and wherein the apparatus further comprises a transmitter coupled to the processor and configured to send the target information to an ingress node on the forwarding path.

15. A computer program product comprising computer-executable instructions stored on a non-transitory computer-readable storage medium that, when executed by a processor, cause an apparatus to:

obtain initial information of a forwarding path of a data packet in segment routing (SR), wherein the initial information comprises a plurality of first path identifiers; and generate target information of the forwarding path based on the initial information, wherein the target information comprises one or more first node segment identifiers, and wherein generating the target information comprises a procedure of:

obtaining a node list of the forwarding path, setting an i$^{th}$ node in the node list as a first start node, and setting a j$^{th}$ node in the node list as a first end node, wherein a first value of i is 1, and wherein a second value of j is a length value of the node list;

determining whether the first start node and the first end node are a same node, and ending the procedure when the first start node and the first end node are the same node and determining whether a first path indicated by all nodes arranged in sequence from the first start node to the first end node in the node list is a first unique shortest path from the first start node to the first end node in the SR when the first start node and the first end node are not the same node; and recording a second node segment identifier of the first end node in the target information, updating the first value to be equal to the second value, updating the second value to be equal to the length value, setting the i$^{th}$ node as the first start node, setting the j$^{th}$ node as the first end node, and re-perform determining whether the first start node and the first end node are the same node when the first path is the first unique shortest path and updating the second value to j−1, setting the j$^{th}$ node as the first end node, and re-perform determining whether the first start node and the first end node are the same node when the first path is not the first unique shortest path, wherein a third node segment identifier in the first node segment identifiers corresponds to a plurality of second path identifiers in the initial information, and wherein each of the first node segment identifiers corresponding to a plurality of third path identifiers in the initial information is of a corresponding end node on a corresponding path indicated by all the third path identifiers corresponding to each of the first node segment identifiers.

16. The computer program product of claim 15, wherein the computer-executable instructions further cause the apparatus to send the data packet based on the target information, and wherein the data packet comprises the target information.

17. The computer program product of claim 15, wherein the initial information comprises an adjacency segment identifier list, and wherein each of the first path identifiers, the second path identifiers, and the third path identifiers is an adjacency segment identifier.

18. The computer program product of claim 15, wherein the computer-executable instructions further cause the apparatus to send the target information to an ingress node on the forwarding path.

19. The computer program product of claim 15, wherein the computer-executable instructions further cause the processor to perform a procedure in which apparatus is configured to:

determine whether the first start node and the first end node are adjacent nodes in the node list;

either record an adjacency segment identifier of a second path from the first start node to the first end node in the target information, updating the first value to be equal to the second value, updating the second value to be equal to the length value, setting the i$^{th}$ node as the first start node, setting the j$^{th}$ node as the first end node, and re-perform determining whether the first start node and the first end node are the same node when the first start node and the second end node are the adjacent nodes or determine whether a third path indicated by all nodes arranged in sequence from the first start node to the first end node in the node list is a second unique shortest path from the first start node to the first end node in the SR when the first start node and the first end node are not the adjacent nodes and are not the same node; and either record a fourth node segment identifier of the first end node in the target information, update the first value to be equal to the second value, update the second value to be equal to the length value, set the i$^{th}$ node as the first start node, set the $j^{th}$ node as the second end node, and re-perform determining whether the first start node and the first end node are the same node when the third path is the second unique shortest path or update the second value to j−1, set the $j^{th}$ node as the first end node, and re-perform determining whether the first start node and the first end node are the same node when the third path is not the second unique shortest path.

20. The computer program product of claim 15, wherein the computer-executable instructions further cause the processor to perform a procedure in which apparatus is configured to:

obtain a second node list of the forwarding path, set an $i^{th}$ node in the second node list as a second start node, set a $j^{th}$ node in the second node list as a second end node, and set a temporary end node to an empty node, wherein a first value of i in the second node list is 1, and wherein a second value of j in the second node list is i+1;

determine whether a second end node is a last node in the second node list, and either determining whether the second start node is a penultimate node in the second node list when the second end node is the last node or determine whether a second path indicated by all nodes arranged in sequence from the second start node to the second end node in the second node list is a second unique shortest path from the second start node to the second end node in the SR when the second end node is not the last node;

either record, in the target information, a fifth node segment identifier corresponding to the second end node, and end the procedure when the second start node is not the penultimate node in the second node list or record, in the target information, a first adjacency segment identifier, and end the procedure when the second start node is the penultimate node in the second node list;

either update the temporary end node to the second end node, update the second value in the second node list to j+1, set the $j^{th}$ node in the second node list as the second end node, and re-perform determining whether the second end node is the last node in the second node list when the second path is the second unique shortest path or determine whether the temporary end node is empty when the second path is not the second unique shortest path;

either determine whether the temporary end node is an adjacent node of the second start node when the temporary end node is not empty or record, in the target information, a first adjacency segment identifier indicating a third path from the second start node to the second end node, update the first value in the second node list to be equal to the second value in the second node list, update the second value in the second node list to j+1, set the $i^{th}$ node in the second node list as the second start node, set the $j^{th}$ node in the second node list as the second end node, and re-perform determining whether the second end node is the last node in the second node list when the temporary end node is empty;

either record a second adjacency segment identifier of a fourth path from the second start node to the temporary end node in the target information, updating the first value in the second node list to be equal to j−1, updating the second value in the second node list to j, setting the $i^{th}$ node in the second node list as the second start node, setting the $j^{th}$ node in the second node list as the second end node, setting the temporary end node to be empty, and re-perform determining whether the second end node is a last node in the second node list when the temporary end node is the adjacent node—or record a fourth node segment identifier of the temporary end node in the target information, update the first value in the second node list to be equal to j−1, update the second value in the second node list to j, setting the $i^{th}$ node in the second node list as the second start node, set the $j^{th}$ node in the second node list as the second end node, setting the temporary end node to be empty, and re-perform determining whether the second end node is the last node in the second node list when the temporary end node is not the adjacent node; and record, in the target information, the first adjacency segment identifier indicating the third path from the second start node to the second end node, update the first value in the second node list to be equal to the second value in the second node list, update the second value in the second node list to j+1, setting the $i^{th}$ node in the second node list as the second start node, set the $j^{th}$ node in the second node list as the second end node, and re-perform determining whether the second end node is the last node in the second node list.

\* \* \* \* \*

UNITED STATES PATENT AND TRADEMARK OFFICE
CERTIFICATE OF CORRECTION

PATENT NO. : 11,677,657 B2
APPLICATION NO. : 17/145564
DATED : June 13, 2023
INVENTOR(S) : Cheng Li, Sefano Previdi and Guoyi Chen It is certified that error appears in the above-identified patent and that said Letters Patent is hereby corrected as shown below:

In the Claims

Claim 2, Column 21, Lines 23-24: "and the second first" should read "and the first"

Signed and Sealed this
Eighth Day of August, 2023

Katherine Kelly Vidal
*Director of the United States Patent and Trademark Office*